United States Patent [19]
Doran

[11] Patent Number: 5,548,195
[45] Date of Patent: Aug. 20, 1996

[54] COMPENSATED SERVO CONTROL STAGE POSITIONING APPARATUS

[75] Inventor: Samuel K. Doran, Wappingers Falls, N.Y.

[73] Assignee: International Business Machines Corporation, Armonk, N.Y.

[21] Appl. No.: 362,676

[22] Filed: Dec. 22, 1994

[51] Int. Cl.$^6$ ............................................. G05D 11/08
[52] U.S. Cl. ................... 318/568.19; 318/625; 318/632; 74/480 R
[58] Field of Search .......................... 318/568.19, 568.2, 318/565, 560, 632, 640, 625, 687, 38, 649, 632; 250/548; 74/479.01, 480 R, 490.08, 40.09

[56] References Cited

U.S. PATENT DOCUMENTS

| | | | |
|---|---|---|---|
| 3,555,254 | 1/1971 | Gerber | 235/151.11 |
| 3,889,164 | 6/1975 | Nishizawa et al. | 318/640 |
| 4,016,396 | 4/1977 | Hassan et al. | 219/121 EB |
| 4,019,109 | 4/1977 | McCoy et al. | 318/640 |
| 4,117,385 | 9/1978 | Limbach, II et al. | 318/578 |
| 4,438,917 | 3/1984 | Janssen et al. | 271/227 |
| 4,555,650 | 11/1985 | Asakawa | 318/135 |
| 4,676,630 | 6/1987 | Matsushita et al. | 355/53 |
| 4,676,649 | 6/1987 | Phillips | 250/548 X |
| 4,775,877 | 10/1988 | Kosugi et al. | 355/53 |
| 4,792,693 | 12/1988 | Yamaguchi et al. | 250/548 |
| 4,891,526 | 1/1990 | Reeds | 250/442.1 |
| 5,031,547 | 7/1991 | Hirose | 108/140 |
| 5,114,234 | 5/1992 | Otsuka et al. | 356/358 |
| 5,140,242 | 8/1992 | Doran et al. | 318/640 |
| 5,142,156 | 8/1992 | Oszwa et al. | 250/548 |
| 5,150,152 | 9/1992 | Isohata et al. | 355/53 |
| 5,153,494 | 10/1992 | Hollis, Jr. | 318/640 |
| 5,160,877 | 11/1992 | Fujiwara et al. | 318/568.21 |
| 5,194,743 | 3/1993 | Aoyama et al. | 250/548 |
| 5,210,476 | 5/1993 | Kazato | 318/560 |
| 5,243,195 | 9/1993 | Nishi | 250/548 |
| 5,391,871 | 2/1995 | Matsuda et al. | 250/306 |

*Primary Examiner*—Brian Sircus
*Attorney, Agent, or Firm*—Charles W. Peterson, Jr.

[57] ABSTRACT

A stage positioning apparatus including a stage and a servo control system. The servo control system includes a compensation circuit. The compensation circuit determines the cosine of the angle between the off-axis drive bar and the direction of travel. A voltage, proportional to the cosine, is multiplied by the on-axis drive error signal to develop an off-axis compensation voltage. Each drive's new error signal is compensated by its respective off-axis compensation voltage.

9 Claims, 6 Drawing Sheets

COMPENSATED SERVO CONTROL STAGE POSITIONING APPARATUS

FIELD OF THE INVENTION

The present invention is related to a servo controlled positioning stage apparatus for accurately positioning a work stage and, in particular, to the servo control circuit for a servo controlled positioning stage mechanisms.

BACKGROUND OF THE INVENTION

Servo guided stages are known. See, for example, U.S. Pat. No. 5,140,242 to Doran et al, entitled "Servo Guided Stage Systems" which is incorporated herein by reference, and includes a drive stage as provided in FIG. 1.

FIG. 1 shows the electrical schematic diagram of the control system for a stage 20. Three identical velocity servos shown in FIG. 2 are used to move the three capstan drive units 22, 24 and 26. When the servo control electronics 28 receives a new destination from a host computer 30 on lines 32, a series of velocity values are sent to the velocity servos 22, 24 and 26 to cause the stage 20 to move to the desired new destination. The closed loop position servo loop gain vs frequency and the maximum values of stage velocity, acceleration and rate of change of acceleration are controlled by stored parameters and software in the servo control electronics 28.

An X-Y joystick 39 also provides input to the control electronics 28 for manual control of the position of the x-y-theta stage 20.

The Laser Position Transducer and Servo Control electronics 28 receives the X position signals from the output of the X axis receiver 34 through cable 36. Control electronics 28 also receives the output of Y-axis receiver 38 through cable 40. Electronics 28 also receives the output of theta receiver 42 through cable 44. Interferometer 46 employs a pair of light beams directed to target mirror 48. For the Theta and Y axis measurements by receivers 38 and 42, a pair of interferometers are housed in an integrated structure 50. Laser beams 52 and 54 pass to the Theta receiver 42 and Y-axis receiver 38, respectively, from the interferometers in structure 50. The interferometers operate with the target mirror 56 where the pair of light beams for each are shown as single beams 58 and 60, respectively, for convenience of illustration.

The electronics 28 have X-error output 62 to the positive input of summing circuit 64 which provides an output 70 to X-drive amplifier 66 which energizes motor 22. The tachometer feedback 68 connects to the negative input of summing circuit 64 to provide negative feedback.

The electronics 28 also have a Y-error output 22 to the positive input of summing circuit 74 and summing circuit 76. Summing circuit 74 provides an output 78 to Y+Theta drive amplifier 80 which energizes motor 26 through drive line 82. The tachometer feedback on line 84 is connected to the negative input of summing circuit 74 to provide negative feedback. The electronics 28 further have a Theta-error output 86 to the negative input of summing circuit 76 and the positive input of summing circuit 74.

Summing circuit 76 provides an output 87 to Y-theta drive amplifier 88 which energizes motor 24 through line 90. The tachometer feedback 92 connects to the negative input of summing circuit 76 to provide negative feedback.

The stage is moved by three drive bars 94, 98, and 96 which are driven by capstans 22, 24, and 26 which are rotated by motors with integral tachometers. The motors are driven by power amplifiers 80, 88 and 66. The rotational speed of each capstan and, ultimately, the linear velocity of the drive bar and stage is controlled by three velocity servos. Each velocity servo loop is composed of a driver, motor, tachometer and a summing junction. The driver supplies current to the motor which accelerates the motor until rotational speed measured by the tachometer equals the error signals (X ERROR, Y ERROR, or Theta ERROR) coming into the summing junctions.

When the servo control electronics 28 receives a new destination from the host computer 30 on lines 32, a series of velocity values are sent to the velocity servos driving capstans 22, 24 and 26 which cause the stage 20 to move to the desired new destination.

When pure X motion is desired, the host computer loads a new X destination. A series of X velocity commands are given to move the X motor 22 and drive bar 94 until the stage position error is driven to zero at the new X location. While the stage is moving in the X axis, the Y position is interferometrically monitored and in response to disturbances in its Y position, the Y position servo is driving the Y motors 24 and 26 to actively keep the Y position error near zero. Also during the X move, Theta disturbances will occur. So, the Theta is also interferometrically monitored and in response to detected variations in Theta, the Theta servo actively drives the Y motors 24 and 26 differentially to keep the YAW near zero during the move and to hold it near zero after the move.

The Theta servo maintains the Theta (YAW angle) of the stage near zero by electronically superimposing small velocity corrections 86 to the Y velocity commands 72 in summing junctions 74 and 76. The dedicated closed loop Theta servo is constantly compensating for tiny gain differences in amplifiers 80 and 88 and motors 24 and 26, inertia differences in the stage and drive bars 96 and 98 and dynamic friction differences in the bearing pads. The Theta servo also removes the Theta disturbances caused by the X drive bar 94. Since the task of maintaining a small value of Theta is accomplished by a dedicated Theta servo, the Y position servo hardware and software can be identical to the X position servo.

If a Theta value other than zero is desired, the host computer loads the Theta value into the electronics 28 and the Y drive bars 96 and 98 are pushed and pulled by motors 24 and 26 as required to achieve the new Theta value.

Pure Y motion can be achieved by loading a new Y destination and maintaining the same X position. When the stage is driven with Pure X motion or Pure Y motion, the direction in which the stage is driven is called the "on-axis" direction. The othogonal direction to the on-axis direction is called the "off-axis" direction. Typically, the stage is stepped incrementally in either the X or Y direction. When the stage is stepped, the servo develops an error signal (not shown) internal to the electronics module 28, that is the difference between the actual position of the stage 22 and the preferred stage (X, Y) location. This error is known as a following error.

In FIG. 2, the stage 20 is shown centrally positioned relative to its base 100. For illustration, a workpiece 102 is held on the stage. FIG. 3 is a plot of the following error for a 2 mm Pure X step for the stage 20 positioned in FIG. 2. As shown by the "Y" marked trace, the off-axis following error for a 2 mm step in the position of FIG. 2 is inconsequential.

Using the normal requirement that to be considered in place, the stage must be within 5 μm of its objective endpoint coordinates, the move is complete after 100 ms. However, for this prior art stepper, it was found that the average stepping time across the entire stage field is appreciably longer than 100 ms. Furthermore, it was found that the off-axis following error in prior art steppers is not uniform in virtually every stepper stage location. This non-uniformity in following error results in longer stepping an settling times that degrade stepper throughput.

For example, with the stage in the off-center location of FIG. 4, the following error for a 2 mm on-axis step (in the x direction) is shown in FIG. 5. The on-axis following error in FIGS. 3 and 5 is nearly identical for the first 70 msecs. Conversely, the off-axis following error is dramatically higher in FIG. 5. The off-axis following error in this off-center position lags the on-axis following error and, eventually, as the off-axis following error dissipates, it induces a backlash effect in the on-axis position that results in an additional on-axis following error. Furthermore, in this off-center position, neither the on-axis, nor the off-axis following error settles to within 5 μm until about 135 ms have passed. Thus, in the position of FIG. 3, off-axis following error is almost equal to on-axis and move time is 35% longer than for stage in the position of FIG. 1.

In a step and repeat lithography system, move time is overhead time. Typically, exposing a single layer requires 6K steps. Consequently, the wafer handling time for each wafer exposure could average 6K×0.05 secs=5 minutes, thereby significantly impacting wafer throughput.

This off-axis following error in prior art stepper stages occurred because the positioning servo loop does not have sufficient bandwidth to respond quickly enough to the unanticipated disturbance from on-axis motion.

PURPOSES OF THE INVENTION

It is a purpose of the invention to increase wafer throughput on servo controlled stepping apparatus.

It is another purpose of the invention to reduce step and repeat time on servo controlled stepping apparatus.

It is yet another purpose of the invention to reduce the step setting time on servo controlled stepping apparatus.

It is yet another purpose of the invention to improve stepper off-axis responsiveness.

It is yet another purpose of the invention to reduce off-axis continuous motion following errors on servo controlled stepping apparatus.

It is yet another purpose of the invention to extend the continuous motion scan path of step-and-repeat servo guided stage systems to write-on-the-fly type and scanning lithography type applications.

SUMMARY OF THE INVENTION

The present invention is a stage positioning apparatus with a stage and compensated servo control system. The servo control system includes means for selecting the stage's location. The stage's position is monitored interferometrically. The interferometric monitor also determines the stage's position. In response to a difference signal between the selected position and the stage's determined position, error signals are generated to drive the stage to the selected position. A compensation circuit anticipates position related parasitic errors and compensates the drive error signals to minimize parasitic errors.

The compensation circuit includes a pair of cosine circuits receiving a first and second positional voltage, said first and second positional voltages identifying a stage position, said pair of cosine circuits each providing a cosine voltage proportional to the cosine of the angle of a drive bar with respect to a direction of travel of said stage; a first of said pair of cosine circuits receiving an X position as said first positional voltage and said second positional voltage being a Y position; the second of said pair of cosine circuits receiving said Y position as said first positional voltage and said second positional voltage being said X position; a first multiplier combining an X error signal with said cosine voltage provided from said first of said cosine circuits and providing a first radial error signal; a first adder for said first radial error signal with a Y error signal; a second multiplier combining said Y error signal with said cosine voltage provided from said second of said cosine circuits and providing a second radial error signal; and a second adder for combining said second radial error signal with said X error signal.

Each of the pair of cosine circuits includes a first adder receiving a first position voltage and offsetting said received first position by a first offset voltage, said first adder generating a first offset position voltage; a second adder receiving said first position voltage and offsetting said received first position by a second offset voltage, said second adder generating a second offset position voltage; a first multiplier receiving said first offset voltage and providing a first squared voltage proportional to the square of the first offset voltage; a second multiplier receiving said second offset voltage and providing a second square voltage proportional to the square of the second offset voltage; said second squared voltage being a first output; an adder for combining said first squared voltage with a third squared voltage, said third squared voltage being from the second squared voltage output of another cosine circuit; a logarithmic module receiving the combined first squared voltage and third squared voltage and providing a square root voltage proportional to the square root of the received combined voltages; and a divider receiving the square root voltage and the first offset position voltage and providing a cosine voltage.

TECHNICAL DESCRIPTION OF THE PREFERRED EMBODIMENT

Figure 6:
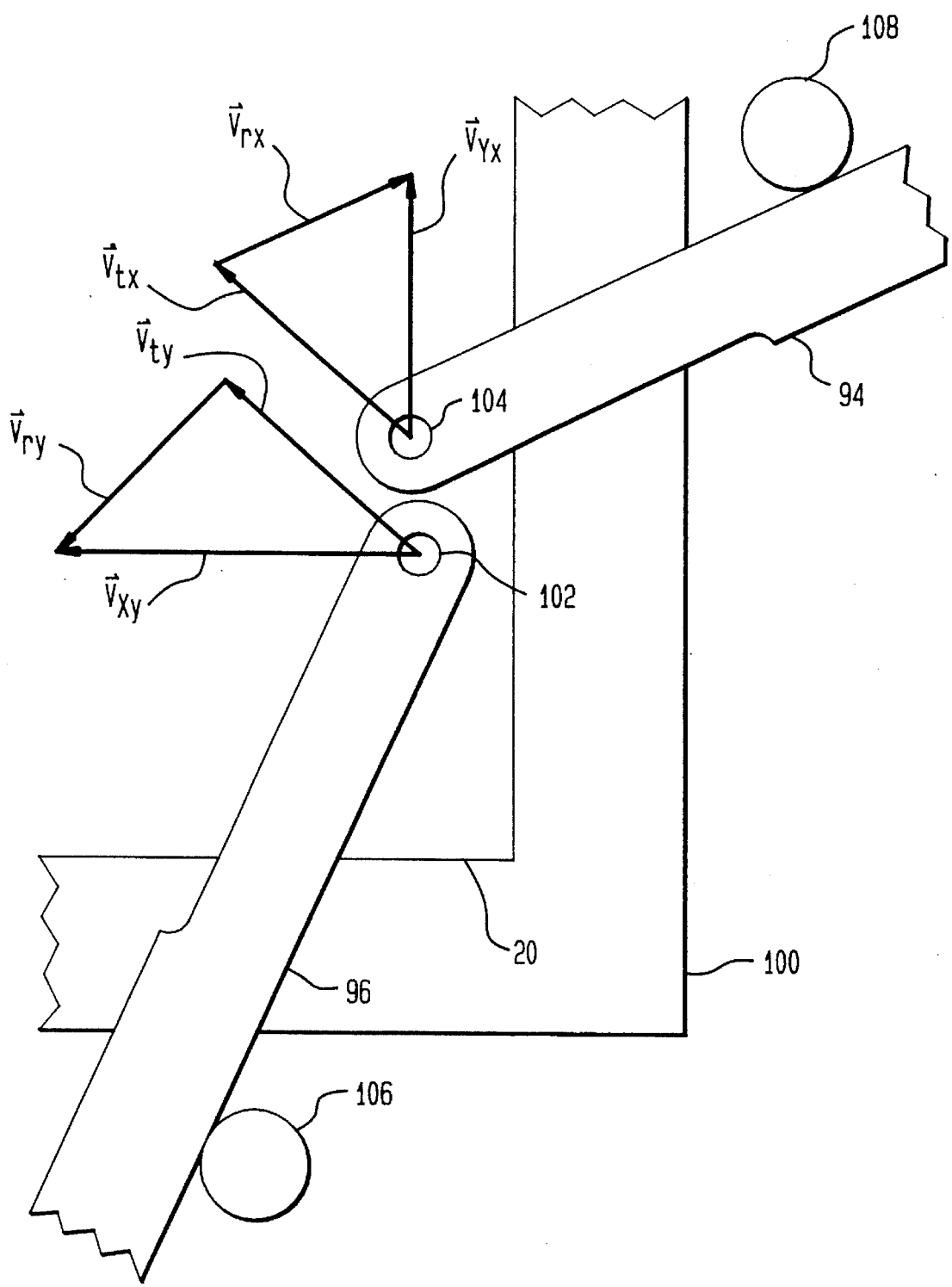
FIG. 6 is a vector diagram for the prior art stepper stage in an off-center position.

FIG. 6 shows a stage 20 at an off-center location with its velocity Vectors $\overline{V}_{xy}$ for a Pure X move on Y pivot 102 and $\overline{V}_{Yx}$ for a Pure Y move on X pivot 104. Although, positioned off-center for illustration purposes only, the velocity vectors for the stage 20 are as in FIG. 6 for any position with appropriate magnitudinal compensation. Ideally, the direction of each of pivot point's off-axis velocity vector $\overline{V}_{xy}$ or $\overline{V}_{yx}$ is constant during a pure X or Y step. However, in actuality, it is not.

The reason that each pivot point's off-axis velocity vector changes during a pure X or Y can be understood by reducing each off-axis velocity vector to the sum of two components. The first component is a radial component, along the direction of its respective drive bar 94 or 96. The second component is a tangential component which is othoganal to the radial component. Thus, $$\overline{V_{xy}} = \overline{V_{ry}} + \overline{V_{ty}};\ \text{and}$$

$$\overline{V_{yx}} = \overline{V_{rx}} + \overline{V_{tx}}$$

where the radial component is identified with the subscript r, and the tangential component is identified with the subscript t.

Because their respective angle with drive bars 96 and 94 vary from 90° with location, the off-axis velocity vectors' components also vary. Furthermore, the larger the angle deviation from 90°, the larger the radial component. The radial component was thought to be neglectable in prior art stage system servo controls. However, this heretofore neglected radial component is the source of the unanticipated off-axis following error and the stage's resulting unexpectedly long step time. The tangential component is the actual instantaneous off-axis velocity vector in prior art systems, resulting from neglecting the radial component. Thus, the on-axis induced off-axis following error can be compensated by subtracting the radial component of the off-axis pin's velocity. The problem with the substantial off-axis velocity radial component in the prior art servo control system is that it is not anticipated by the off-axis control system. The off-axis control system has been commanded to hold a constant position during the move. When the on-axis drive bar is extended to produce the desired straight motion, the stage wants to move in an arc where the capstan drive bar contact point is the center of the arc. The off-axis servo control system sees this arc motion as a position disturbance error caused by the on-axis motion. The off-axis control system then reacts to get rid of the error. The result is straight travel with a substantial following error caused by the delay of the off-axis reacting to the error caused by the arc. Thus, by feeding a portion of the on-axis drive signal into the off-axis drive motor where the amount of this drive signal is a function of the stage position, can greatly reduce the off-axis following error and reduce the total step time.

The radial component can be determined from geometric analysis of the vectors. It can be shown that:
For pivot 102:

$$\frac{|\overline{V}_{ry}|}{|\overline{V}_{xy}|} = \frac{X_y}{R_Y}$$

$$R_y = \sqrt{X_{Y2} + Y_{Y2}}$$

$$|\overline{V}_{ry}| = \frac{|\overline{V}_{Xy}| * X_y}{\sqrt{X_{y2} + Y_{y2}}}$$

and for pivot 104:

$$\frac{|\overline{V}_{rx}|}{|\overline{V}_{Yx}|} = \frac{Y_x}{R_x}$$

$$R_x = \sqrt{X_{x2} + Y_{x2}}$$

$$|\overline{V}_{rx}| = \frac{|\overline{V}_{Yx}| * Y_x}{\sqrt{X_{x2} + Y_{x2}}}$$

Where:
$X_y$ is X distance from the Y capstan 106 drive bar 96 contact point to pivot point 102; $Y_y$ is the Y distance from the Y capstan 106 drive bar 96 contact point to pivot point 102; $X_x$ is the X distance from the X capstan 108 drive bar 94 contact point to X pivot 104; and $Y_x$ is Y distance from the X capstan 108 drive bar 94 contact point to X pivot 104; and, $R_x$ and $R_y$ are the total distance from each respective pivot point to the respective capstan drive bar contact points.

In the preferred embodiment of the present invention, the stage position is passed from the Laser Position Transducer 28 to a dedicated computer. The dedicated computer then calculates the cosine of each drive bar angle in real time. The real time calculations are passed back to the Servo Control Electronics 28. The Servo Control Electronics 28 generates both X and Y radial components and offsets both X Error 62 and Y Error 72 by subtracting the respective radial component compensation therefrom. Alternatively, compensation voltages for the X drive bar and Y drive bar may be passed directly to adders 64 and 76 to be added to X Error and Y Error respectively.

Figure 1:
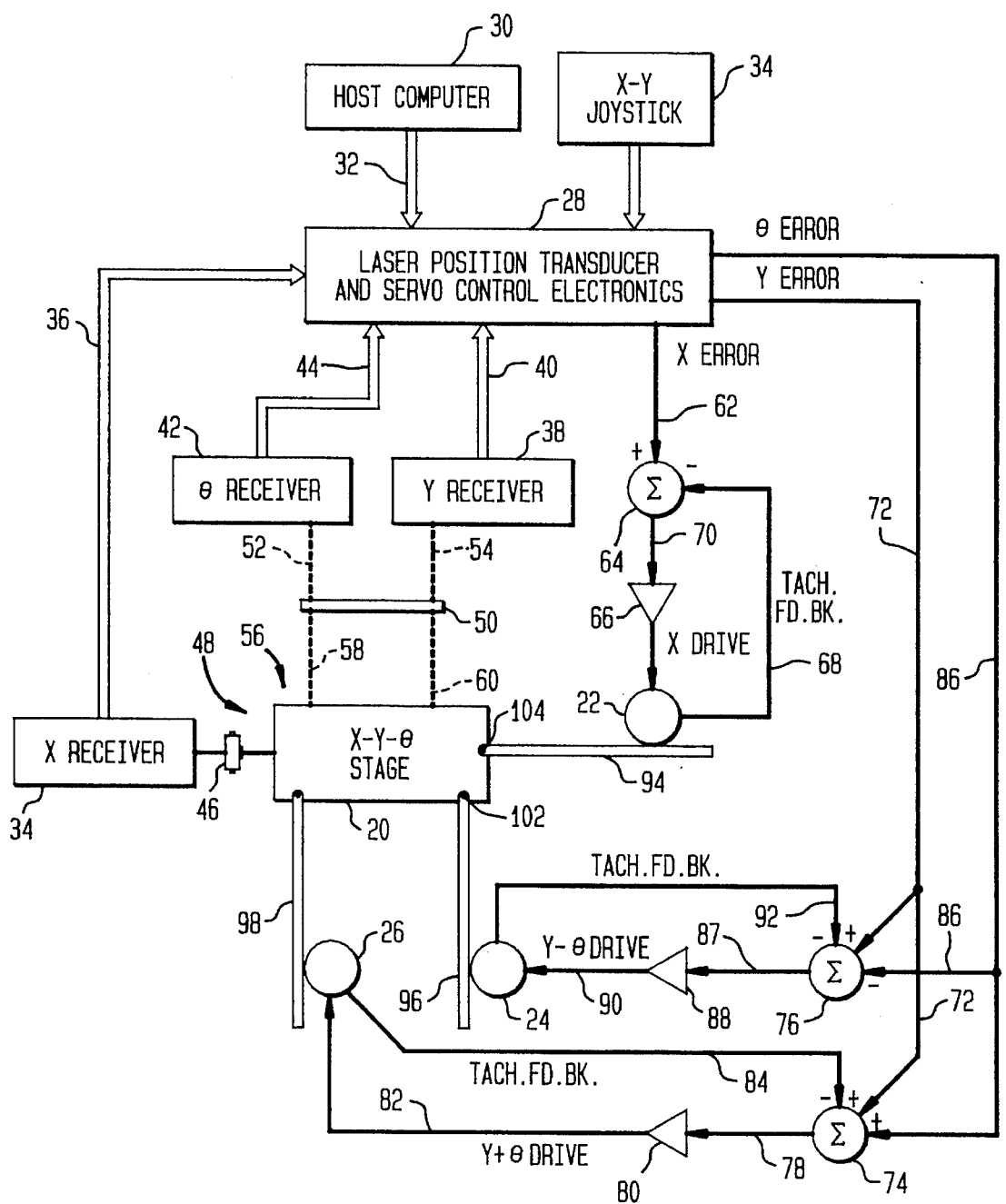
FIG. 1 is a schematic representation of a prior art control station.
Figure 2:
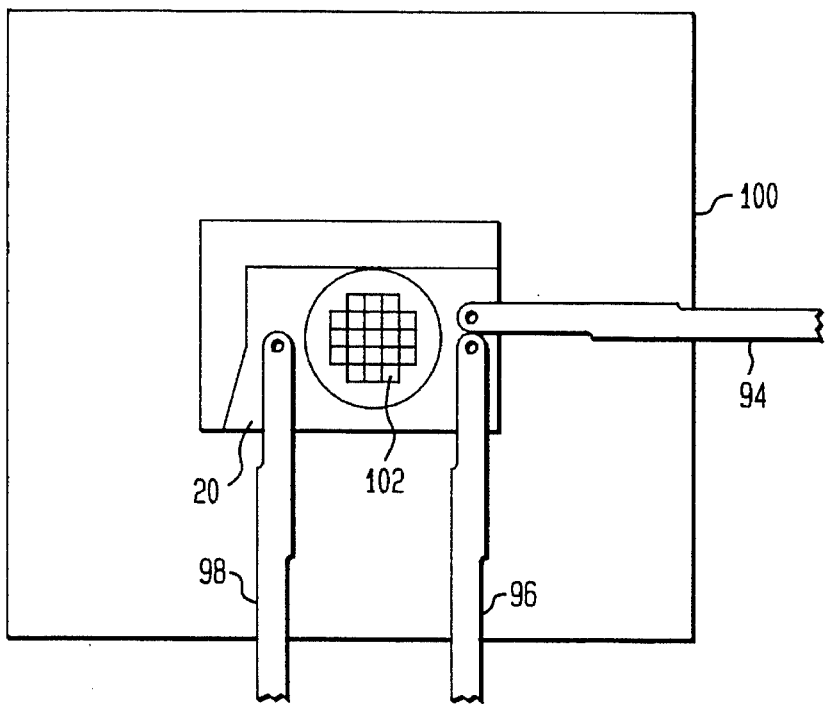
FIG. 2 shows the prior art stepper stage located at a central position.
Figure 3:
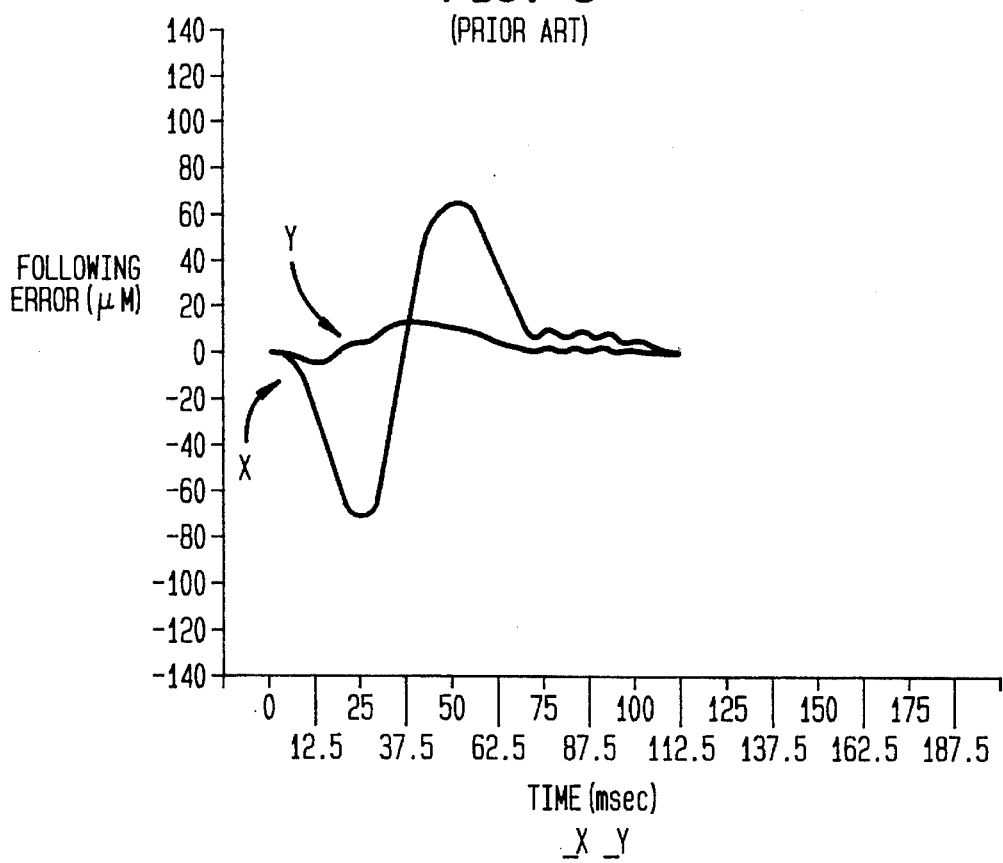
FIG. 3 is a plot of the following error from a 2 mm Pure X move for the prior art stepper stage in the location of FIG. 2.
Figure 4:
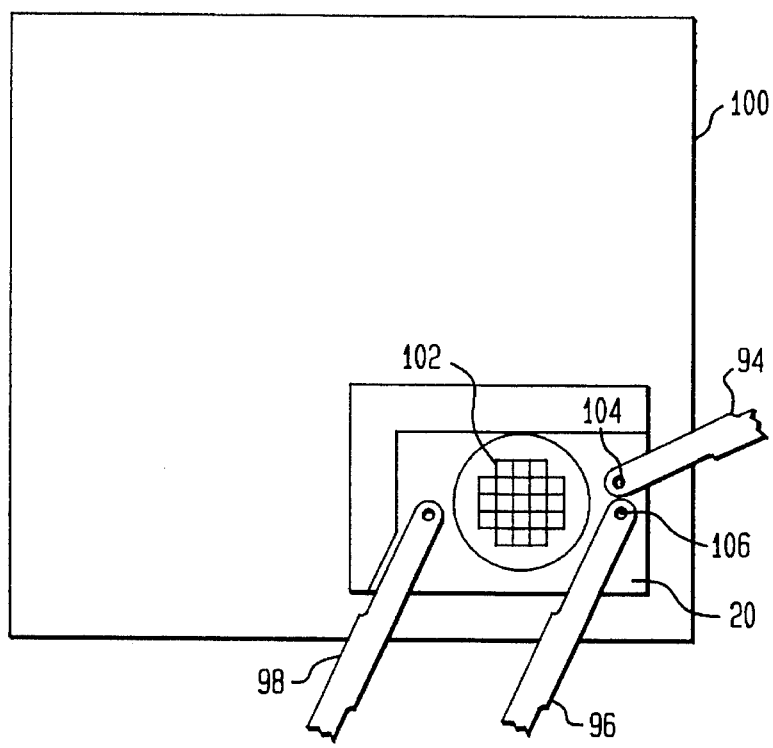
FIG. 4 shows the prior art stepper stage located at an off-center position.
Figure 5:
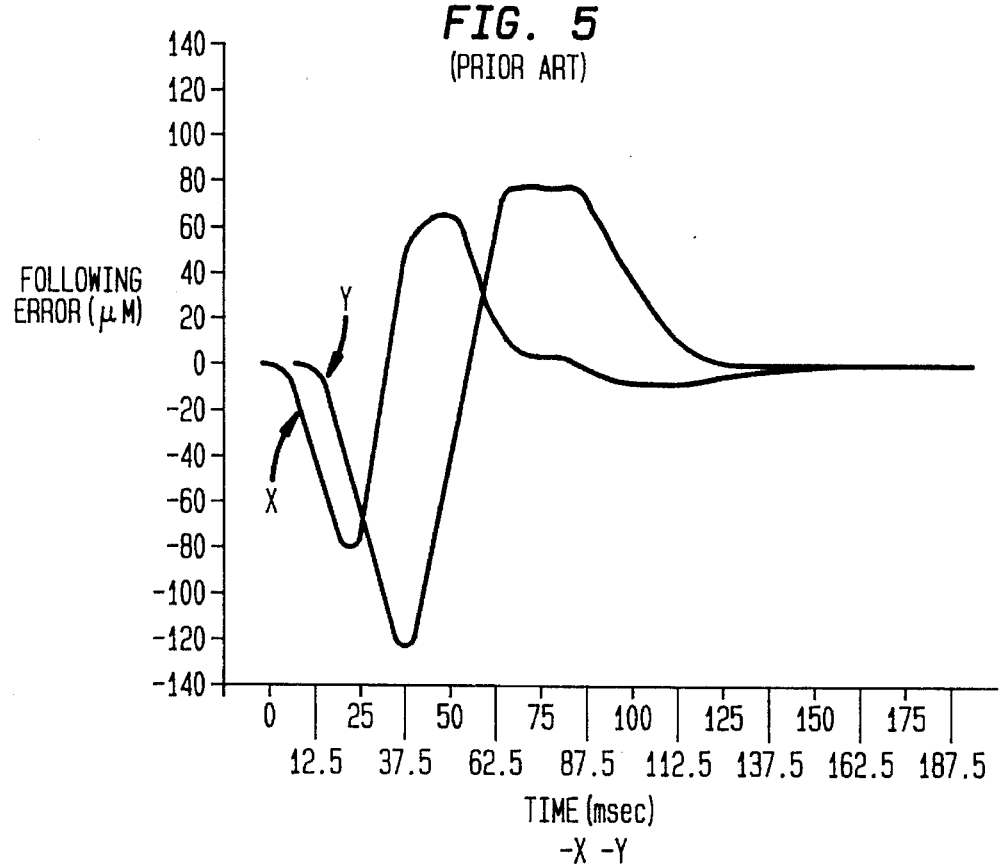
FIG. 5 is a plot of the following error from a 2 mm Pure X move for the prior art stepper stage in the off-center location of FIG. 4.
Figure 7:
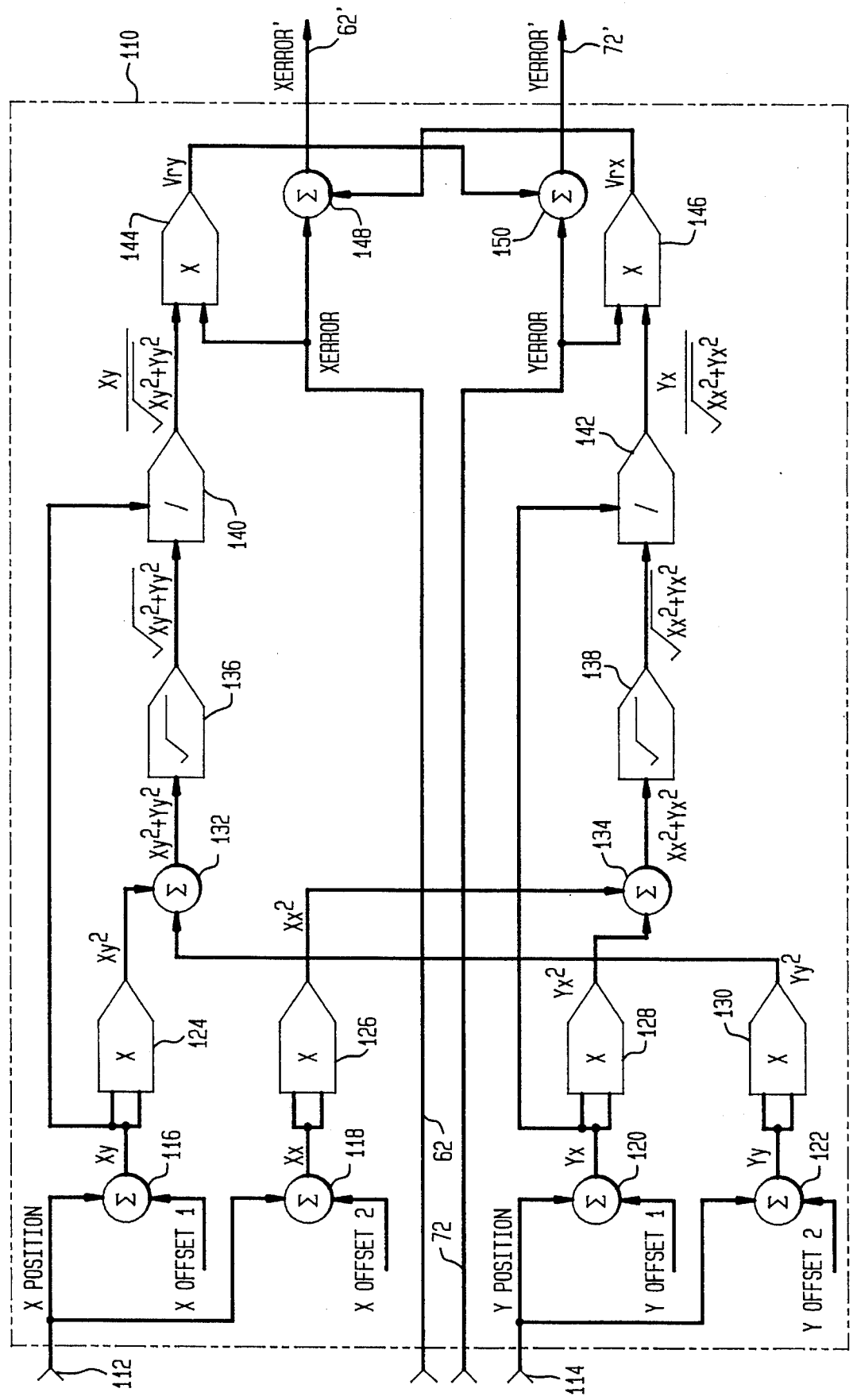
FIG. 7 is a correction circuit according to the preferred embodiment.
Figure 8:
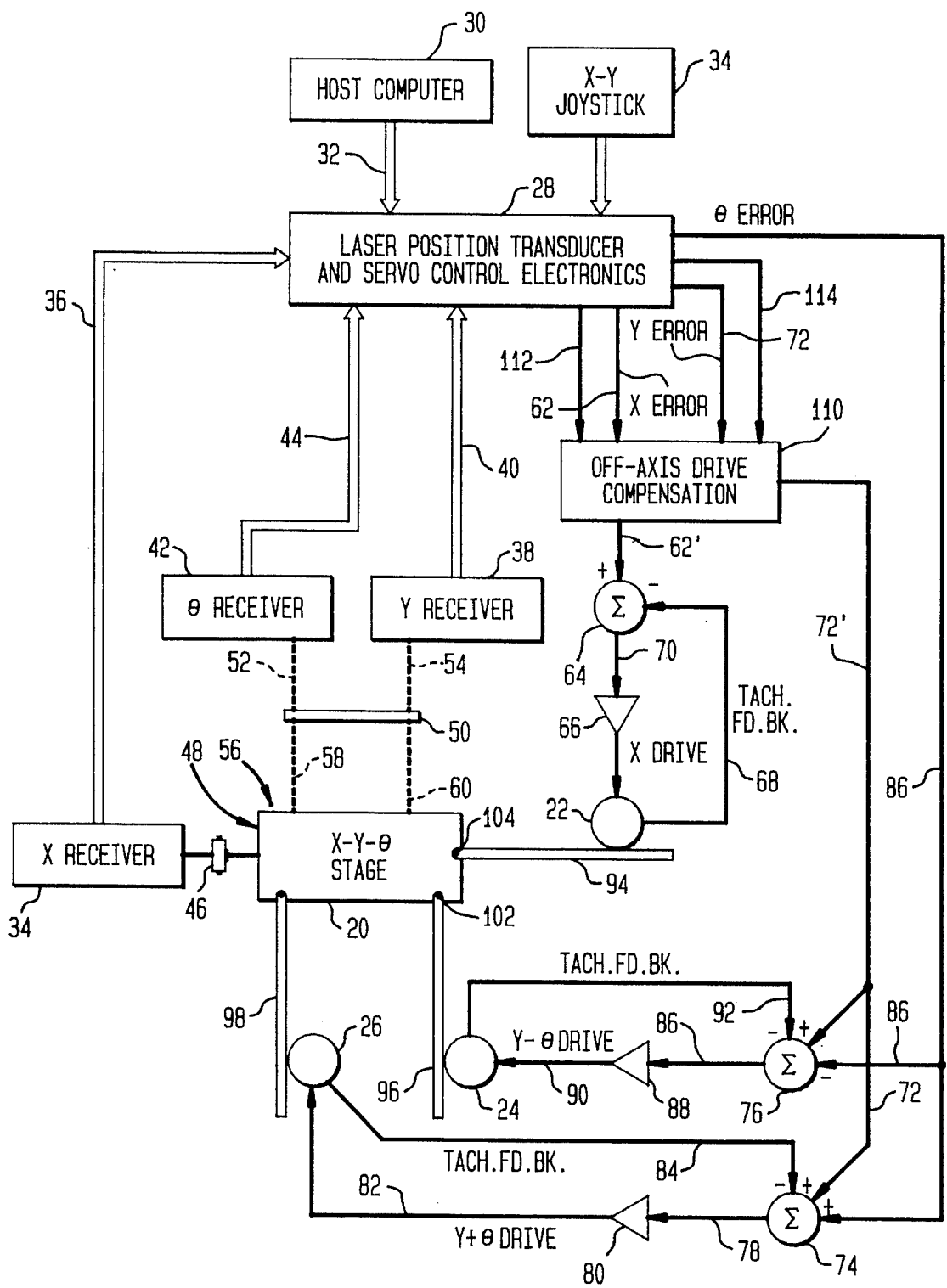
FIG. 8 is a schematic representation of a control station according to the preferred embodiment of the present invention.

FIG. 7 is a servo control circuit 110 for an alternate embodiment stage positioning system that when inserted in the system of FIG. 1 as in FIG. 8 compensates for the formerly uncompensated radial component. As provided above, the stage position is identified, interferometrically, and provided from X receiver 34 and Y receiver 38 to Laser Position Transducer and Servo Control Electronics 28. The Laser Position Transducer 28 receives X and Y position voltages proportional to the stage position from the X and Y receivers 34 and 40. The received X and Y voltages are fed from the Laser Position Transducer and Servo Control Electronics 28 to the new Off-Axis Drive Compensation Circuit 110 at X position input 112 and Y position input 114.

First, an offset voltage is added to the stage's actual X and Y position voltages to translate the stage position X and Y voltages to the pivot points' 102, 104 X and Y. The offset voltages are constants and preferably are made adjustable through a potentiometer. Thus, "X offset 1" is added to the "X position" signal at adder 116 to provide Y pivot 102 X voltage $X_y$; "X offset 2" is added to the "X position" signal at adder 118 to provide X pivot 104 X voltage $X_x$; "Y offset 1" is added to the "Y position" signal at adder 120 to provide X pivot 104 Y voltage $Y_x$; and "Y offset 2" is added to the Y position signal at adder 122 to provide Y pivot 102 Y voltage $Y_y$.

Next, having determined $X_x$, $X_y$, $Y_x$ and $Y_y$, voltages proportional to $R_x$ and $R_y$ can be generated. Each of the voltages $X_x$, $X_y$, $Y_x$ and $Y_y$ are squared in multipliers 124, 126, 128 and 130, respectively. Then $X_y^2$ and $Y_y^2$ are added in adder 132 and $X_x^2$ and $Y_x^2$ are added in adder 134. $R_y$ is derived by taking the square root of the output of adder 132 in logarithmic module 136. Likewise, $R_x$ is derived by taking the square root of the output of adder 134 in module 138.

Next, in dividers 140 and 142, the cosine of the angle between each drive bar and its corresponding off-axis velocity vector is determined by dividing $X_y$ by $R_y$ and $Y_x$ by $R_x$, respectively. The off-axis radial components are generated for each pivot point by multiplying the on-axis error signal by the determined cosine. So, a voltage corresponding to the $V_{ry}$ is generated in multiplier 144 and a voltage corresponding to $V_{rx}$ is generated in multiplier 146. Finally, each respective error signal is adjusted in adders 148 and 150 when the off-axis radial component is added to the on-axis error voltage. The compensated error voltage "X error'" and "Y error'" are passed on lines 62' and 72' to adders 64, 74 and 76 as described above.

While the present invention is described in terms of specific embodiments, numerous variations and modifications will occur to a person skilled in the art without departing in spirit from the claimed invention. It is intended that the claims include all those modifications and variations that fall within the spirit of the invention.

I claim:

1. A stage positioning apparatus including a stage and servo control system, said servo control system comprising:

input means for selecting said stage's position;

monitoring means for monitoring and determining the stage's position;

means for generating a first error signal responsive to said selected stage position;

means for generating a second error signal responsive to said selected stage position; and compensation means for offsetting said first error signal and said second error signal responsive to said determined position, said compensation means comprising:

means for determining a first voltage proportional to the cosine of a first drive bar angle with respect to a second direction of travel, and, means for determining a second voltage proportional to the cosine of a second drive bar angle with respect to a first direction of travel.

2. The stage positioning apparatus of claim 1 wherein said compensation means further comprises:

means for generating a first radial error signal; and means for generating a second radial error signal.

3. The apparatus of claim 2 wherein said compensation further comprises:

means for adding said first radial error signal to said first error signal; and means for adding said second radial error signal to said second error signal.

4. The apparatus of claim 2 wherein said means for generating said first radial error signal comprises means for multiplying said second error signal by said first voltage, and said means for generating said second radial error signal comprises means for multiplying said first error signal by said second voltage.

5. A stage positioning apparatus including a stage and servo control system, said servo control system comprising:

input means for selecting said stage's position;

monitoring means for monitoring and determining the stage's position;

X drive control means for generating an X error signal responsive to said selected stage position;

Y drive control means for generating a Y error signal responsive to said selected stage position;

X compensation means for offsetting said X error signal responsive to said determined position and said Y error signal, said X compensation means comprising:

means for determining a first angle, said angle being the angle between the Y axis and an X drive bar, means for generating X radial component, by multiplying the cosine of said first angle and said Y error signal, and means for adding said generated X radial component to said X error signal; and Y compensation means for offsetting said Y error signal responsive to said determined position and said X error signal.

6. A stage positioning apparatus including a stage and servo control system, said servo control system comprising:

input means for selecting said stage's position;

monitoring means for monitoring and determining the stage's position;

X drive control means for generating an X error signal responsive to said selected stage position;

Y drive control means for generating a Y error signal responsive to said selected stage position;

X compensation means for offsetting said X error signal responsive to said determined position and said Y error signal, Y compensation means for offsetting said Y error signal responsive to said determined position and said X error signal, said Y compensation means comprises:

means for determining a first angle, said angle being the angle between the X axis and a Y drive bar, means for generating Y radial component, by multiplying the cosine of said first angle and said X error signal, and means for adding said generated Y radial component to said Y error signal.

7. The stage positioning apparatus of claim 6 wherein said Y compensation means comprises:

means for determining a first angle, said angle being the angle between the X axis and a Y drive bar;

means for generating Y radial component, by multiplying the cosine of said first angle and said X error signal; and means for adding said generated Y radial component to said Y error signal.

8. A compensation circuit for compensating servo control signals in a servo controlled stage positioning apparatus, said compensation circuit comprising:

a pair of cosine circuits receiving a first and second positional voltage, said first and second positional voltages identifying a stage position, said pair of cosine circuits each providing a cosine voltage proportional to the cosine of the angle of a drive bar with respect to a direction of travel of said stage;

a first of said pair of cosine circuits receiving an X position as said first positional voltage and said second positional voltage being a Y position;

the second of said pair of cosine circuits receiving said Y position as said first positional voltage and said second positional voltage being said X position;

a first multiplier combining an X error signal with said cosine voltage provided from said first of said cosine circuits and providing a first radial error signal;

a first adder for said first radial error signal with a Y error signal;

a second multiplier combining said Y error signal with said cosine voltage provided from said second of said cosine circuits and providing a second radial error signal; and a second adder for combining said second radial error signal with said X error signal.

9. The compensation circuit of claim 8, said pair of cosine circuits each comprising:

a first adder receiving a first position voltage and offsetting said received first position by a first offset voltage, said first adder generating a first offset position voltage;

a second adder receiving said first position voltage and offsetting said received first position by a second offset voltage, said second adder generating a second offset position voltage;

a first multiplier receiving said first offset voltage and providing a first squared voltage proportional to the square of the first offset voltage;

a second multiplier receiving said second offset voltage and providing a second square voltage proportional to the square of the second offset voltage;

said second squared voltage being a first output;

an adder for combining said first squared voltage with a third squared voltage, said third squared voltage being from the second squared voltage output of another cosine circuit;

a logarithmic module receiving the combined first squared voltage and third squared voltage and providing a square root voltage proportional to the square root of the received combined voltages; and a divider receiving the square root voltage and the first offset position voltage and providing a cosine voltage.

* * * * *